(12) United States Patent
Osterhart et al.

(10) Patent No.: US 6,219,903 B1
(45) Date of Patent: Apr. 24, 2001

(54) SOLENOID ASSEMBLY WITH HIGH-FLUX C-FRAME AND METHOD OF MAKING SAME

(75) Inventors: Daniel J. Osterhart, Auburn Hills; Charles A. Detweiler, Durand; Robert D. Keller, Davisburg, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/455,241

(22) Filed: Dec. 6, 1999

(51) Int. Cl.⁷ .............................. H01F 7/06; F16K 31/02
(52) U.S. Cl. .......................... 29/602.1; 29/605; 29/606; 251/129.15
(58) Field of Search ........................ 251/129.15, 602.1; 29/605, 606

(56) References Cited

U.S. PATENT DOCUMENTS

| | | | |
|---|---|---|---|
| 3,262,027 | * 7/1966 | Zaleske et al. | 317/165 |
| 4,728,916 | * 3/1988 | Fontecchio et al. | 335/255 |
| 5,076,662 | * 12/1991 | Detweiler | 292/201 |
| 5,232,196 | * 8/1993 | Hutchings et al. | 251/129.08 |
| 5,538,220 | * 7/1996 | LaMarca | 251/129.15 |
| 6,086,042 | * 7/1966 | Scott et al. | 251/129.15 |

* cited by examiner

Primary Examiner—Kevin Shaver
Assistant Examiner—David A. Bonderer
(74) Attorney, Agent, or Firm—Roger A. Johnston

(57) ABSTRACT

A solenoid valve having the valve body formed integrally on one end of the coil bobbin. A C-frame formed integrally from a single piece of sheet stock has at least one of the end of the C-frame deformed over an end of the bobbin and the opposite end thereof received on the opposite end of the bobbin to increase the surface area for flux transfer to a sliding armature within the bobbin for operating a valve obturator. In one embodiment, both ends of the C-frame are each deformed respectively over one end of the bobbin.

3 Claims, 4 Drawing Sheets

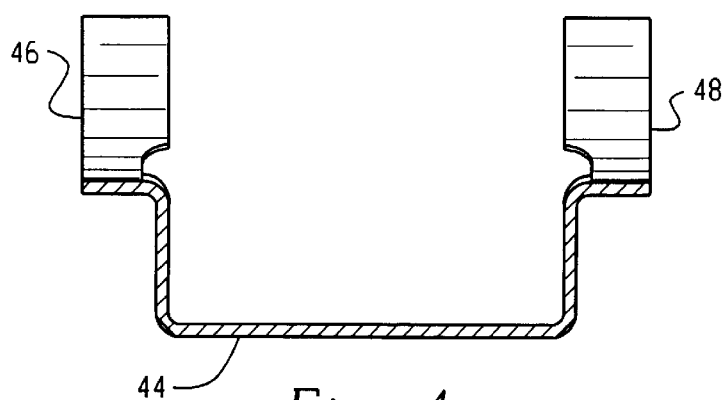
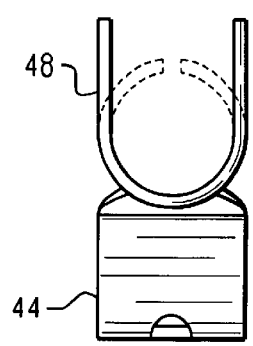
Fig. 4     Fig. 5
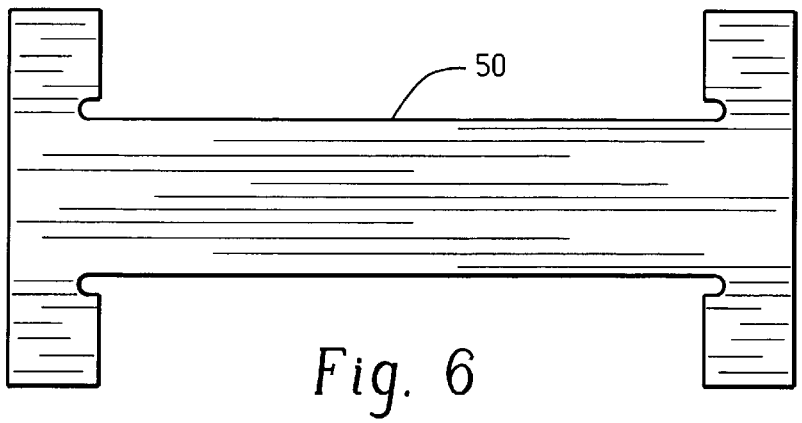
Fig. 6
Fig. 7
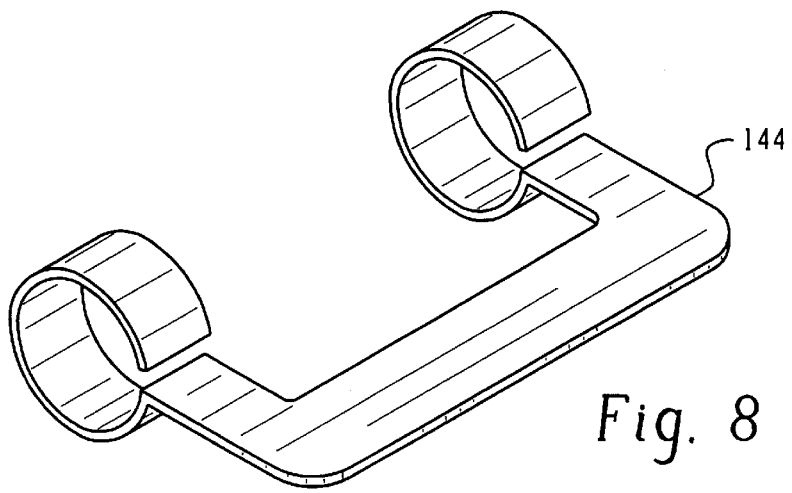
Fig. 8

SOLENOID ASSEMBLY WITH HIGH-FLUX C-FRAME AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electromagnetic actuators or solenoids having an armature disposed for movement within a coil by electromagnetic forces generated upon flow of current through the coil. Solenoids of this type have found widespread usage in actuating electrically operated valves.

In solenoid actuators and particularly solenoid operated valves employed for controlling flow of fluid requiring relatively very low manufacturing costs, it has heretofore been the practice to provide a generally C-shaped pole frame or flux collector for providing a magnetic flux loop about the coil which is typically completed across air gaps through the armature. However, it has been found difficult to provide a simple low cost way of completing the flux loop and attaching the C-shaped flux collector to the coil in a manner that is robust and requires a minimum number of pieces in the assembly and yet provides the desired flux transfer. The problem is particularly difficult in solenoid actuators which are intended for use with a fluid control valve in which the armature is operatively connected to move a moveable valve member or obturator. Furthermore, it has been found difficult to assemble in high volume mass production the valve obturator with the valve body and armature and coil elements in a manner which is not cost prohibitive for low voltage automotive applications.

In automotive applications, the relative low voltage available from the power source requires a high number of turns of the coil for the available current in order to produce the required electromagnetic forces to effect armature movement for valve operation against the forces of the fluid supply pressure acting on the valve obturator. This difficulty in designing solenoids for such applications is further aggravated where there is poor flux transfer across the air gaps between the flux collector and the armature which is the result of the minimized surface area at the flux gap, which arises from the multiple piece construction of the pole frame and coil assembly. Thus, it has been desired to improve the magnetic flux transfer in a low voltage solenoid actuator assembly particularly for a fluid valve and to minimize the number of pieces and the manufacturing costs yet provide an assembly which is robust and suitable for the environment of automotive engine and transmission actuator service environment.

BRIEF SUMMARY OF THE INVENTION

The present invention provides a solenoid operated valve having a C-shaped pole frame or flux collector having a high flux transfer across the air gaps to the armature and employs a C-frame formed by stamping from a single blank sheet stock. The C-frame for the solenoid valve assembly of the present invention has at least one of the ends of the C-shape curled about an axis passing through the ends and over an extension beyond the flange of the coil bobbin so as to secure the bobbin and coil onto the C-frame.

In one embodiment, one end of the C-frame is apertured to be received directly over one coil bobbin flange with the end opposite said one end of the C-frame curled over an extension of the other coil bobbin flange. In other embodiments, both ends of the C-frame are curled respectively over an extension of one of the bobbin flanges.

The valve body is formed integrally with one end of the bobbin; and, the armature may be assembled through the bobbin hollow through the opposite end of the bobbin from the valve body.

The present invention thus provides a simple robust and low cost way of making a solenoid operated valve assembly which is particularly suitable for low voltage low current applications such as those found in control actuators for engines and transmissions in high volume motor vehicle mass production.

BRIEF DESCRIPTION OF THE DRAWINGS

FIG. 4 is a side elevation view of the flux collector of the present invention;

FIG. 5 is a right hand elevation view of the flux collector of FIG. 4;

FIG. 6 is a plan view of the flat blank from which the flux collector of FIG. 4 is formed;

FIG. 7 is an edge view of the blank of FIG. 6;

FIG. 8 is an alternate embodiment of the flux collector of the present invention;

DETAILED DESCRIPTION OF THE INVENTION

Figure 1:
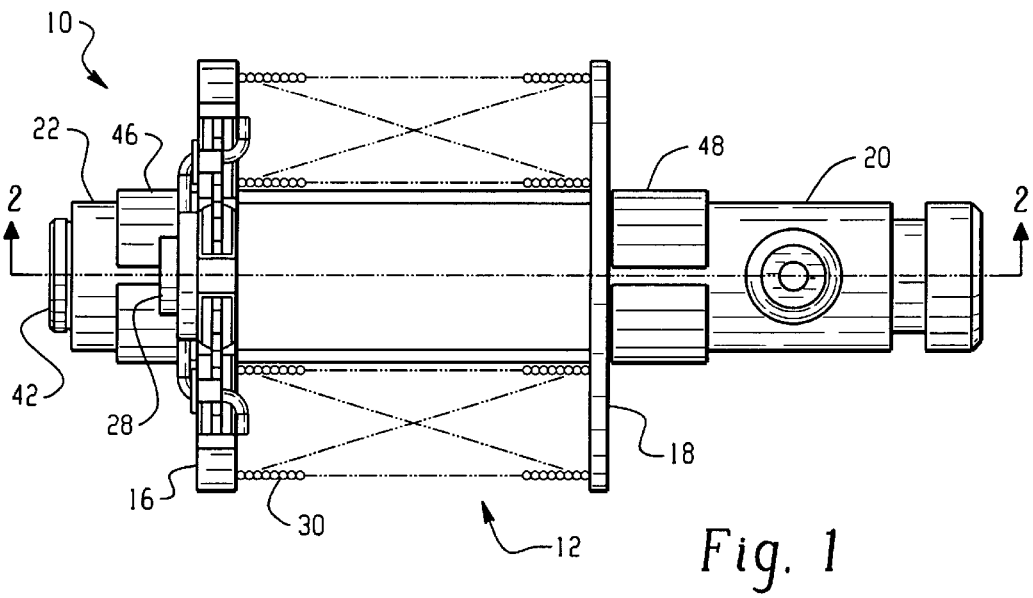
FIG. 1 is a plan view of the valve assembly of the present invention.
Figure 2:
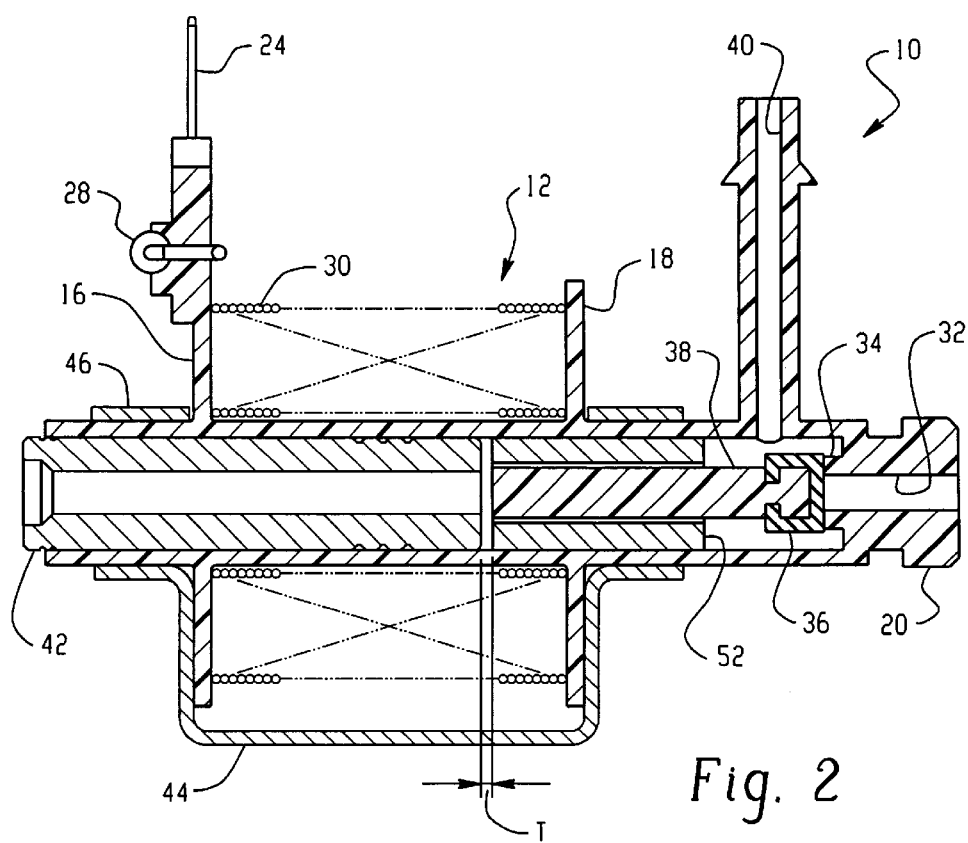
FIG. 2 is a section view taken along section-indicating lines 2—2 of FIG. 1.
Figure 3:
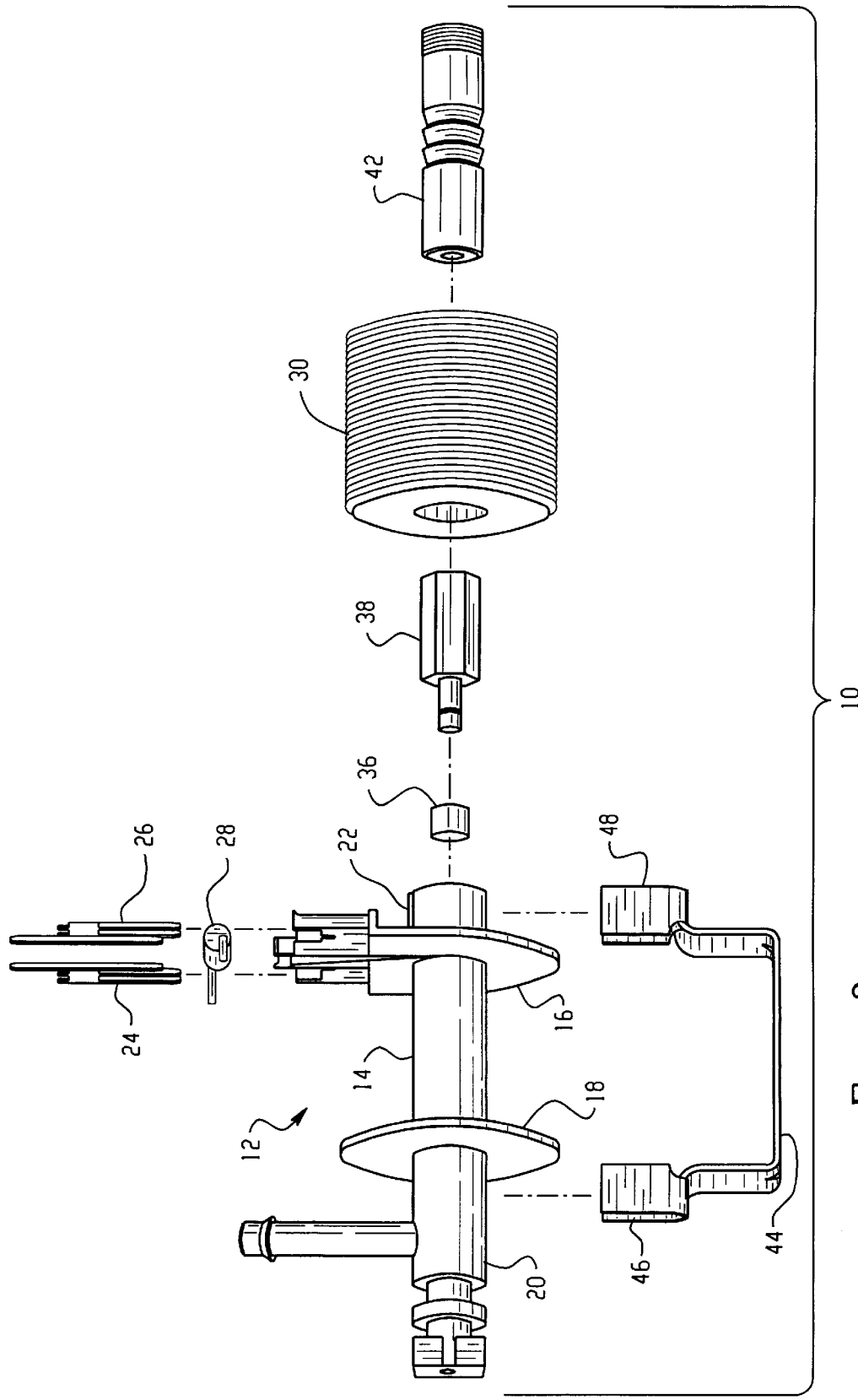
FIG. 3 is an exploded view of the valve assembly of FIG. 1.
Figure 11:
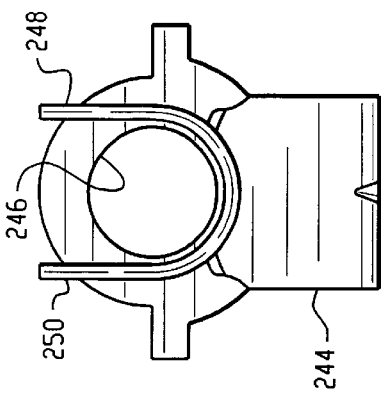
FIG. 11 is a right end view of the embodiment of FIG. 9.
Figure 9:
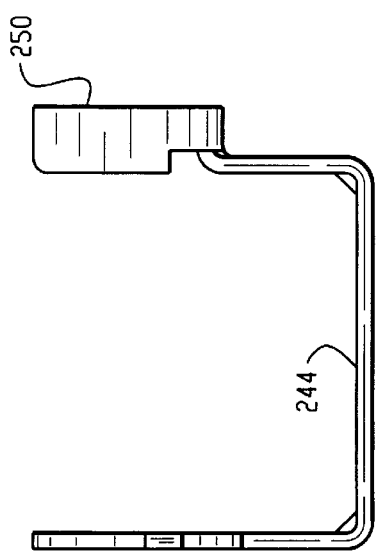
FIG. 9 is a side elevation of another embodiment o the flux collector of the present invention.
Figure 12:
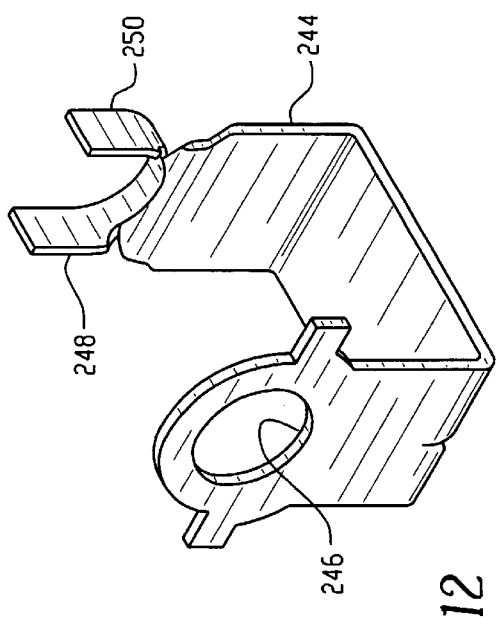
FIG. 12 is an axonometric view of the embodiment of FIG. 9.
Figure 10:
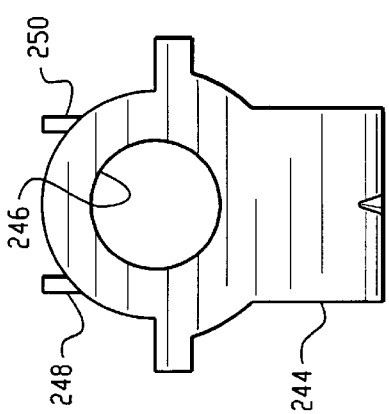
FIG. 10 is a left end view of the embodiment of FIG. 9.

Referring to FIGS. 1 through 3, the valve assembly of the present invention is indicated generally at 10 and includes a valve body and bobbin subassembly indicated generally at 12 which includes the bobbin 14 having a pair of spaced radially outwardly extending flanges 16, 18 with end portions extending axially outwardly therefrom as denoted by reference numerals 20, 22 with the end portion 20 comprising the valve body. End flange 16 has electrical connector terminals 24,26 mounted therein and may include a resistor 28 connected therebetween.

Bobbin 14 has disposed thereon preferably by winding a coil 30 formed by a plurality of turns of conductive material such as fine copper magnet wire. The valve body 20 has a valve port 32 formed in the end thereof which has formed therearound an annular valve seat 34 which is contacted by a moving valve member or obturator 36 provided on the end of armature 38; and, it will be understood that the valving member 36 closes against the valve seat to control flow between port 32 and port 40 of the valve, either of which may be an inlet or outlet depending upon when the valve is employed for controlling flow of positive pressure or sub-atrnospheric pressure at the inlet thereof.

A stationary pole piece or flux collector 42 is provided in the hollow center of the bobbin and defines an air gap denoted by the reference character T in FIG. 2 with the end of the armature 38 when the valve is in the de-energized state, that is when zero current is flowing through the coil 30.

Referring to FIGS. 3, 4 and 5, a pole frame or flux collector 44 having a generally C-shaped configuration is shown as having the ends of the C-shape bent outwardly and curled upwardly so as to received therein respectively the ends 20, 22 of the bobbin, which ends are denoted respectively by reference numerals 46, 48 in FIGS. 4 and 5.

Referring to FIGS. 1 and 2, the ends 46, 48 of the C-frame 44 are curled or deformed over the ends 20, 22 respectively of the bobbin as shown in solid outline in FIGS. 1 and 2 and in dashed line in FIG. 5. It will be understood with reference to FIGS. 6 and 7 that the C-frame 44 may be formed from the flat blank illustrated and denoted by reference numeral 50. If desired, the bobbin may be provided with an internal guide sleeve or bushing 52 of non-magnetic material for slidably guiding the armature.

Referring to FIG. 8, an alternate arrangement or embodiment of the C-frame or flux collector 144 is shown, which it will be understood, may also be formed from a single blank of flat sheet stock.

Referring now primarily to FIGS. 9 through 12, another embodiment of the C-Frame as formed from a single blank of sheet stock is illustrated at 244 is bifurcated to a generally U-shaped configuration into two arms as denoted by reference numerals 248, 250 which are adapted to be curled over a bobbin flange extension such as extension 20 of the embodiment of FIG. 2.

The present invention thus provides a unique and novel solenoid actuator and valve assembly having the pole frame surrounding the coil formed from a single unitary flat blank of sheet stock with the ends thereof curled over the extensions of the bobbin to provide increased surface area for flux transfer to the armature and also to provide a rigid assembly and reduced manufacturing cost.

Although the invention has hereinabove been described with respect to the illustrated embodiments, it will be understood that the invention is capable of modification and variation and is limited only by the following claims.

What is claimed is:

1. A method of making a solenoid comprising:
   (a) providing a bobbin having a pair of spaced flanges and forming portions extending axially of the flanges;
   (b) winding a coil on said bobbin intermediate the spaced flanges;
   (c) forming a generally C-shaped strip of magnetically permeable material and bifircating one end of the C-shape;
   (d) deforming said one bifurcated end over the axially extending portion of the bobbin and retaining said C-frame, thereon around said coil; and,
   (e) disposing an armature in said bobbin for movement upon current flow in said coil.

2. The method defined in claim 1, wherein said step of forming a C-shaped strip includes forming a blank from sheet stock.

3. The method defined in claim 1, further comprising bifurcating and deforming both ends of said strip, each respectively over one of said axially extending portions of the bobbin.

* * * * *